C. B. RICHARDS.
STEAM TRAP.
No. 45,437. Patented Dec. 13, 1864.
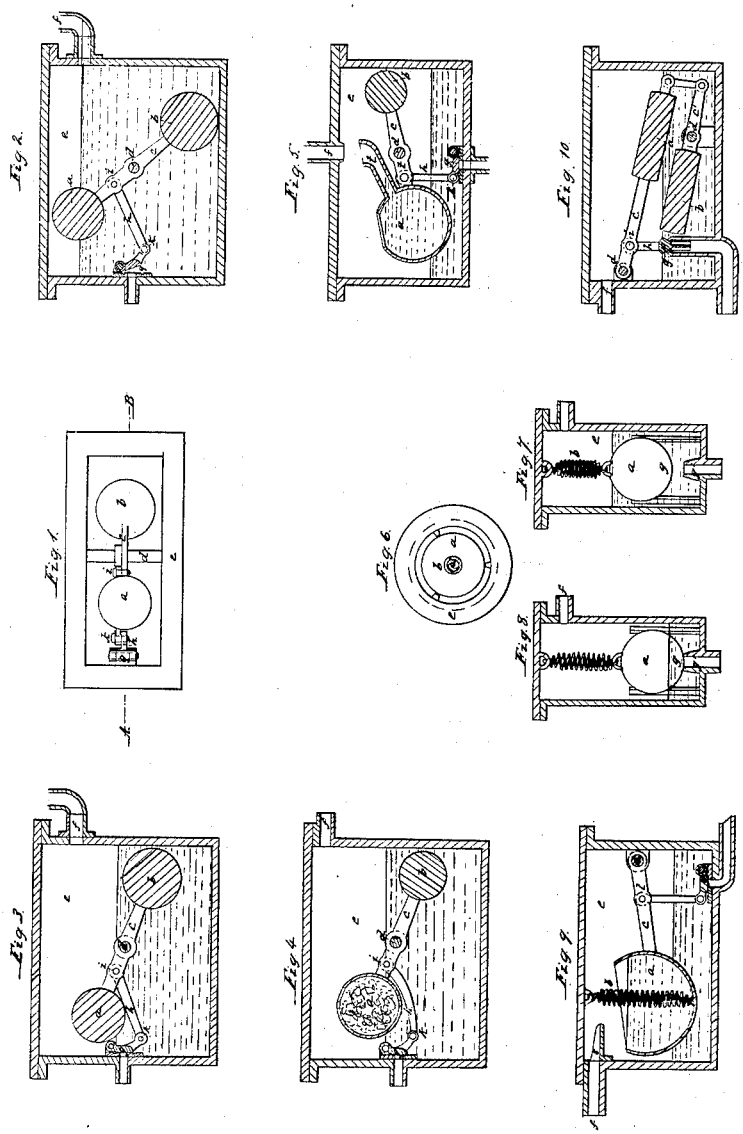

UNITED STATES PATENT OFFICE.

CHARLES B. RICHARDS, OF HARTFORD, CONNECTICUT.

IMPROVEMENT IN STEAM-TRAPS.

Specification forming part of Letters Patent No. 45,437, dated December 13, 1864.

*To all whom it may concern:*

Be it known that I, C. B. RICHARDS, of the city and county of Hartford, in the State of Connecticut, have invented a new and useful Improvement in Steam-Traps; and I do hereby declare the following to be a full, clear, and exact description of the same, reference being had to the accompanying drawings, making part of this specification.

My invention relates to that kind of apparatus for discharging the water of condensation from steam-pipes without waste of steam in which a float, which rises and falls with the level of the water which accumulates in the trap, controls the valve through which the water is discharged. Heretofore the aforesaid floats have usually been in the form of hollow globes, made of thin copper, but these, being subjected to great pressure, unless made with care and at considerable expense, frequently fail by becoming filled with water.

My said invention, having for its object to produce a cheap, simple, and more reliable steam-trap, consists in the employment as a float, in connection with the discharge-valve, of a mass of material the specific gravity of which is nearly equal to or greater than that of water, in combination with a weight, spring, or equivalent counterpoising device, so connected with the heavy float as to partially counteract the weight of the said float and cause it to be acted upon by the water in which it is immersed in a manner as if it were specifically lighter than water, the said float being so connected with the discharge-valve of the trap as to open and close the said valve as the water accumulates or subsides in the trap, substantially as hereinafter clearly set forth.

To enable others skilled in the arts to make and use my invention, I will proceed to a description thereof, referring by letters to the accompanying drawings, making part of this specification, in which similar letters of reference denote corresponding parts.

Figure 1 shows a top view of a steam-trap embodying my invention, the cover of the case being removed so as to show the interior of the trap. Figs. 2 and 3 show vertical sections of the same, taken at the line A B, Fig. 1, showing, respectively, the discharge-valve $g$ open and closed. In these figures, to which the immediately following description refers, $a$ and $b$ are two solid balls of cast-iron of unequal weights, fixed to the opposite ends of a lever, $c$, which is hung at a point about midway between the balls upon a fulcrum-pin, $d$, which is secured to the case $e$ of the trap. $f$ is the inlet pipe by which steam and water of condensation enter the trap, and $g$ is the discharge-valve, which is so connected by a rod, $h$, and pins $i$ and $k$ with the lever $c$ that when the ball $a$ is raised the valve $g$ is opened, as shown in Fig. 2, but when the said ball $a$ falls into the position shown in Fig. 1 the valve $g$ is tightly closed, so as to prevent the escape of water or steam. The valve $g$ is placed in such a position, and is so connected with the lever $c$, that when the valve is closed the whole or greater part of the ball $a$ will lie above the said valve, while the whole or greater part of the ball $b$ lies below the said valve, so that the ball $b$ will always be wholly or nearly immersed in water. The relative weights of the balls $a$ and $b$ are so adjusted that when both balls are wholly immersed in water, $b$ preponderates, but when the ball $b$ only is immersed in water and the ball $a$ is out of water, or nearly so, then $a$ preponderates over $b$.

From the foregoing description the operation of the apparatus can readily be understood, and is as follows: Before applying the trap the case is filled with water up to the level of the discharge-valve $g$. When connection is made between the inlet-pipe $f$ and the steam apparatus which is to be drained, the water of condensation flows into the case and fills it until so much of the ball $a$ is immersed in the water that the bouyant power of the water, acting upon $a$, allows the preponderating force of $b$ to raise the ball $a$, thus opening the valve $g$, through which the water is discharged, whereby the ball $a$, becoming less immersed and following the falling level of the water, gradually closes the valve $g$, shutting it entirely before the level of the water falls so low as to permit steam to escape through the valve.

Fig. 4 represents a longitudinal vertical section of a steam-trap, constructed in a similar manner to that illustrated by Figs. 1, 2, and 3, except that the float-ball $a$ is formed of a hollow metallic shell filled with some suitable lighter material—such as porcelain—baked in the shell. The counterpoise $b$ is of solid metal. The operation of this arrangement is similar in all respects to that of the form of trap already described; but the advantage of this construction is that a float-ball of large bulk (possessing on this account more power to control the valve) may be used, and the inconvenience and expense of the great weight of a large solid metallic float-ball is avoided. If the float-ball be filled with a substance specifically many times lighter than the material of the counter-weight, it will not be necessary to so arrange the apparatus that the counter-weight shall be always immersed in the water, because, on account of the bulk of the counter-weight and its consequent displacement of water being many times less than that of the float-ball, the variation in its effective weight which would occur by its alternate immersion in steam and water will be so slight as not to materially affect the power of the float-ball. I have illustrated such an arrangement by Fig. 5, which shows a longitudinal vertical section of a steam-trap in which $a$ is a hollow globular metallic shell filled with water, and $b$ is the counter-weight, which is of solid iron or lead. $g$ is the discharge-valve, which is at the bottom of the trap and is connected by a rod, $h$, with a pin, $i$, located in the lever $c$ (to the opposite ends of which the float and counter-weight are attached) at a point between the fulcrum $d$ of said lever and the float $a$. To insure a constantly uniform weight of the float $a$ a small tube, $t$, leading into the interior of $a$ and having its open mouth directly under the inlet-pipe $f$, receives a portion of the water which flows into the trap and conducting it into the float, keeps it full to overflowing, and consequently of invariable weight. The operation of this arrangement is similar to that of the forms already described, the relative weights of the float-ball and counter-weight being so adjusted that when the float is immersed in water the counter-weight preponderates and the float rises, thereby opening the discharge-valve, while the contrary is the effect when the water falls so as to leave the float out of water.

Figs. 6, 7, and 8 illustrate another modification of my invention, Fig. 6 showing a top view of a steam-trap with the cover removed, Figs. 7 and 8 showing the interior of the same, half of the case, cut by a vertical plane, being removed for that purpose, in which $a$ is a solid float-ball which may be made of material specifically heavier than water. The lower part, $g$, of this ball $a$ fits the opening in the upper part of the discharge-pipe $g'$ and forms the discharge-valve. The ball $a$ is counterpoised by a spring, $b$, one end of which is attached to the ball and the other to the cover of the trap. The length and tension of the spring $b$ are so adjusted that when the trap contains only sufficient water to cover a small part of the ball $a$, as shown in Fig. 8, the said ball will rest in its seat on the discharge-pipe; but when the trap contains enough water to wholly or nearly cover the ball $a$, the buoyancy of the water, lessening the preponderating force of the said ball, will cause the spring to lift the ball a short distance, so that the discharge-opening will be uncovered, but this will again be closed by the ball when the level of the water declines. Fig. 7 shows the discharge-pipe wide open.

Fig. 9 illustrates a modification of my invention, showing a vertical section of a steam-trap operating on the principle of the one last described, but the float $a$, instead of being solid, consists of a metallic shell filled with water. This is open at the top, and is kept brimful by receiving through a spout, $s$, a portion of the water which enters at the inlet-pipe $f$. The float $a$ is at the extremity of a lever which actuates the discharge-valve $g$ by a rod, $h$. $b$ is a spiral spring, the force of which counterpoises the float $a$, so as to render it buoyant in the water in which it is immersed.

The advantage of employing a spring to counterpoise the float is that thereby the weight of the counter-weight may be avoided and the apparatus thus rendered less unwieldy.

Fig. 10 illustrates the last modification of my invention which I shall describe, and shows a vertical section of a steam-trap in which a solid float, $a$, in the form of a metallic slab, is counterpoised through the levers $c$ and $c'$, by a similar slab, $b$, which is constantly immersed in water, the discharge-valve being actuated through a pin, $i$, and rod, $h$, by the lever $c$, to which the float $a$ is attached.

Having thus described several modifications of my invention, I do not wish to limit my claim to these arrangements only. Nor do I wish to claim the principle of counterpoising a heavy body to cause it to act as a float, for this has been done before; but—

What I claim as my invention, and desire to secure by Letters Patent, is

The employment, in combination with the discharge-valve of a steam-trap and the float by which it is actuated, of a counterpoising weight, or an equivalent therefor, so connected with the said float as to render it more buoyant, substantially in the manner hereinbefore clearly set forth.

In testimony whereof I have hereunto set my hand this 13th day of June, 1864.

C. B. RICHARDS.

In presence of—
 CHARLES E. FELLOWES,
 FRANCIS FELLOWES.